United States Patent [19]

Ganguli

[11] Patent Number: 5,116,421
[45] Date of Patent: May 26, 1992

[54] HIGH TEMPERATURE FLUID LOSS ADDITIVE FOR CEMENT SLURRY AND METHOD OF CEMENTING

[75] Inventor: Kalyan K. Ganguli, The Woodlands, Tex.

[73] Assignee: The Western Company of North America, Houston, Tex.

[21] Appl. No.: 626,572

[22] Filed: Dec. 12, 1990

[51] Int. Cl.⁵ .................. C04B 7/35; E21B 33/14
[52] U.S. Cl. .................. 106/823; 106/639; 106/653; 106/724; 106/802; 106/810; 106/819; 252/8.551; 524/4; 166/285; 166/293; 507/120; 507/121; 507/140
[58] Field of Search ......... 106/639, 655, 713, 724, 106/802, 810, 819, 823; 252/8.511, 8.513, 8.514, 8.551; 166/285, 293; 524/4

[56] References Cited

U.S. PATENT DOCUMENTS

| | | | |
|---|---|---|---|
| 4,015,991 | 4/1977 | Persinski et al. | 106/90 |
| 4,309,523 | 1/1982 | Engelhardt et al. | 526/240 |
| 4,555,269 | 11/1985 | Rao et al. | 106/90 |
| 4,632,186 | 12/1986 | Boncan et al. | 166/293 |
| 4,674,574 | 6/1987 | Saloly et al. | 166/293 |
| 4,700,780 | 10/1987 | Brothers | 166/293 |
| 4,806,164 | 2/1989 | Brothers | 106/90 |
| 4,865,129 | 9/1989 | Ryles | 166/295 |

*Primary Examiner*—William R. Dixon, Jr.
*Assistant Examiner*—Michael A. Marcheschi
*Attorney, Agent, or Firm*—Peter A. Bielinski

[57] ABSTRACT

A fluid loss control additive for use in well cementing operations wherein the downhole temperature ranges from about 200° to about 500° F. The additive is a polymer comprised of 2-acrylamido-2-methyl propane-3-sulphonic acid, N-vinyl,-N-methylacetamide, in the presence or absence of arcylamide. This additive is also effective in saltwater cement slurries.

33 Claims, No Drawings under 5,116,421

HIGH TEMPERATURE FLUID LOSS ADDITIVE FOR CEMENT SLURRY AND METHOD OF CEMENTING

BACKGROUND OF THE INVENTION

1. Field of the Invention

The present invention relates generally to oil well cementing compositions and methods for their use and more specifically to fluid loss additives for such compositions.

2. Description of the Prior Art

In well completion operations, a casing or liner is suspended in the borehole, and cement is pumped down the casing. The cement flows back up the annulus between the outside of the casing and the wall of the borehole. One problem encountered in this operation is the loss of fluid from the cement slurry into the earth contacting the cement. Such fluid loss causes the dehydrated cement slurry to have reduced strength and an uncontrollable setting rate. In addition, fluid loss can result in damage to the adjacent strata formation.

Polymer compositions have long been added to cementing compositions as a fluid loss additive. For example, U.S. Pat. No. 4,015,991 discloses a fluid loss additive for a hydraulic cement slurry consisting of hydrolyzed copolymers of acrylamide (Am) and 2-acrylamido-2-methyl propanesulfonic acid (AMPS®, a trademark of Lubrizol Corporation). U.S. Pat. No. 4,555,269 discloses the use, as a fluid loss additive, of a copolymer of $N_1N_1$ dimethyl-acrylamide and 2-acrylamido, 2-methyl propane sulfonic acid. However, Am/AMPS copolymers are not efficient at reducing fluid loss at bottom hole circulating temperatures (BHCT) ranges of 200°-500° F. Moreover, these copolymers are not particularly suitable for use in saltwater cement slurries.

U.S. Pat. No. 4,674,574 discloses a terpolymer as a fluid loss agent. These terpolymers are comprised of an unsaturated polybasic acid, a nonionic monomer, and a vinyl containing alkyl or aromatic substituted sulfonate.

U.S Pat. No. 4,806,164 discloses a fluid loss additive comprising a polymer of styrene and AMPS®. This polymer exerts a fluid loss preventative effect at test temperatures up to 180° F.

U.S. Pat. No. 4,700,780 discloses a fluid loss additive that is effective in the presence of substantial salt concentrations. This fluid loss additive comprises a polymer or polymer salt or AMPS®, styrene, and acrylic acid.

The prior art methods are deficient in that none of these methods function well in high temperature wells, i.e. from 200°-500° F. Thus, the need exists for a cement fluid loss additive for a cement fluid loss additive that will function in high temperature wells and preferably is compatible with high salt concentrations.

SUMMARY OF THE INVENTION

This invention relates to a cementing composition with enhanced fluid loss properties for use in high temperature wells and is compatible with high salt concentrations and a method of using such cementing composition. In one embodiment of the present invention a cementing composition is provided being composed of water, hydraulic cement, and a fluid loss additive comprised of 2-acrylamido-2-methyl propane-3-sulphonic acid, N-vinyl,-N-methylacetamide, in the presence or absence of acrylamide.

In another embodiment the polymers of the present invention are comprised of the product of 2-acrylamido-2-methyl propane sulphonic acid in an amount of from 5 to 95 percent by weight, vinylacylamide in an amount of from 5 to 95 percent by weight, and acrylamide in an amount of from 0 to 80 percent by weight. This polymer is effective at well bottom hole temperatures ranging from 200° to 500° F., and is not adversely affected by brine.

In yet another embodiment of the present invention there is provided a method of cementing a casing in a borehole penetrating a high temperature subterranean formation comprising: introducing a cementing composition into the annulus between said conduit and said formation, said cementing composition containing a fluid loss additive comprised of a copolymer of (1) 5 to 95 weight percent of 2-acrylamido-2-methylpropane-3-sulphonic acid; (2) 5 to 95 weight percent of a vinylacylamide; and (3) 0 to 80 weight percent of acrylamide; and allowing said cementing composition to set within said space.

In still yet another embodiment of the present invention there is provided a method of cementing a conduit in a borehole penetrating a high temperature subterranean formation by introducing a cementing composition into the annulus between said conduit and said formation, said cementing composition comprising: cement; an aqueous fluid containing dissolved salt; and a fluid loss additive comprised of a copolymer of (1) 5 to 95 weight percent of 2-acrylamido-2-methylpropane-3-sulphonic acid; (2) 5 to 95 weight percent of a vinylacylamide; and (3) 0 to 80 weight percent of acrylamide.

DETAILED DESCRIPTION OF THE INVENTION

The composition of the invention is comprised of an aqueous fluid, hydraulic cement and a polymer comprising the reaction product of the polymerization of 2-acrylamido-2-methyl propane-3-sulphonic acid (AMPS), vinylacylamide, and if appropriate, acrylamide.

More particular description of the invention is set forth below with respect to typical embodiments thereof, but the described embodiments should not be considered limiting of its scope, for the invention may admit to other equally effective embodiments which may be apparent from the description to one of ordinary skill in the art.

AMPS is present in the polymerization reaction product in acid or salt form in an amount of from about 5 to about 95 percent by weight. More preferably, AMPS is present in an amount from about 10 to about 90 percent by weight. Most preferably, AMPS is present in an amount of from about 60 to about 70 percent by weight.

Vinylacylamide is present in an amount of from about 5 to 95 percent by weight. More preferably, vinylacylamide is present in an amount of from about 7 to 80 percent by weight. Most preferably, vinylacylamide is present in an amount of from about 10 to 30 percent.

Acrylamide is present in an amount of from about 0 to 80 percent by weight; more preferably, in an amount of from about 5 to 60 percent by weight. Most preferably, acrylamide is present in an amount of from about 10 to 30 percent by weight. Illustrative of the acrylamides useful in the present invention is a terpolymer product available commercially from Hoecht Celanese under the trade name Hostamer ® V2825.

Although the amount of fluid loss additive admixed with the cement may be varied, the polymers generally are admixed with the cementing composition in an amount of from about 0.65 to about 1.7 percent by weight of the dry cement. Preferably, the fluid loss additive is admixed with the cement in an amount of from about 1.0 to about 1.5 percent, and most preferably, from about 1.3 to about 1.4 percent weight of dry cement.

The fluid loss additive of this invention is especially effective in high temperature wells. This additive is well suited for use in wells having a bottom hole temperature of from about 200° F. to about 500° F. The fluid loss additive of this invention is effective even in the presence of salt water. Fluid loss characteristics may be maintained in salt cement compositions, such as saturated NaCl and seawater, without changing the rheological properties of the cement. Indeed, fluid loss characteristics may be maintained at a cement salt concentration of approximately 38 percent or in seawater.

Cement compositions containing such fluid loss additives display improved pumpability. This feature, in turn, enhances drilling fluid removal and decreases lost circulation when cementing a conduit.

The cement portion of the composition of this invention may be any of the API classes of cement as defined in the American Petroleum Institute Bulletin entitled "API Specification for Material & Testing for Well Cements" dated January 1982 ("API Spec. 10"), and incorporated herein by reference. These include cements defined as classes "G" and "H" in API Spec. 10.

Other types of well known and conventional additives may be incorporated into the cement composition, such as other fluid loss additives or viscosifiers, retarders, accelerators, dispensants, weight-adjusting materials or fillers and the like. These additives may include, for example, (1) heavy weight additives, such as hematite, ilmenite, silica flour and sand; (2) cement retarders such as lignins and lignosulfonates; and (3) additives for controlling lost circulation such as walnut hulls and cellophane flakes.

Use of this invention as a fluid loss additive will result in significant reductions in water loss rate. Under API standards, excellent fluid loss control (30-100 ml/30 min.) may be achieved by the addition of about 0.65 to about 1.7 percent by weight of the cement, of such fluid loss additive to a normal dense cement.

EXAMPLE I

The following tests were performed to examine the utility of the present invention as a high temperature fluid loss additive.

Cement compositions were prepared using Class H LeHavre Cement, mixing water, and high temperature fluid loss additive as set forth in Table I. The fluid loss additives had a weight percent ratio as depicted in Table I. The tests were performed as follows: The slurry was prepared according to the procedure in Section 5 of the *Specification for Materials and Testing for Well Cements—API Specification* 10 (*Spec* 10), Fifth Edition, Jul. 1, 1990. The slurry was then heated in a high temperature high pressure (HTHP) consistometer following a schedule depending on the simulation temperature and the pressure of the bottom-hole as outlined in Appendix E of the Spec 10 mentioned above. The slurry was conditioned for an extra 20 minutes after it reached the BHCT. The machine was turned off, and the slurry taken out if the BHCT was 200° F. or less. Otherwise, the slurries were always cooled down to 200° F. or less, and the pressure was released before they were taken out. The slurries were then poured into a Baroid fluid loss cell preheated to the BHCT, but not more than 200° F. A pressure of about 500 psi was applied at the top valve. The cell was then heated to the BHCT if it was 200° F. or above. Once the BHCT was reached, the top valve pressure was increased to, depending on the BHCT, somewhere between 1100-1400 psi, according to Spec 10 (Appendix F). The pressure on the bottom valve, according to the same spec, was somewhere between 100-400 psi. The fluid loss was measured through a 325 mesh stainless steel screen backed by 60 mesh.

When no mention of HTHP conditioning is made, it will be assumed that the slurries were conditioned in an atmospheric consistometer at 200° F. or less.

TABLE I[d]

| | | | | Cement: LeHavre H | | | | |
|---|---|---|---|---|---|---|---|---|
| System # | % Fluid Loss[a] Additive | % Silica Sand or Flour | % Weighting Agent | % Total Retarder, Including Retarder Aid, if Any | % H$_2$O | Density in Pounds Per Gallon | BHCT °F. | API Fluid Loss (ml/30 min) |
| 0 | 0.00 | 35.0 | — | 1.0 | 50.0 | 16.2 | 308 | 2060 (calculated) |
| 1 | 0.65 | 35.0 | 10.0 | 0.25 | 47.4 | 16.7 | 200 | 54 |
| 2 | 0.65 | 35.0 | 10.0 | 0.15 | 50.0 | 16.5 | 200 | 78 |
| 3 | 0.65 | 35.0 | 10.0 | 1.00 | 47.4 | 16.7 | 250 | 180 |
| 4 | 0.935 | 35.0 | 20.0 | 0.35 | 48.3 | 17.0 | 250 | 52 |
| 5 | 0.935 | 35.0 | 10.0 | 0.50 | 47.4 | 16.6 | 250 | 46 |
| 6 | 0.935 | 35.0 | 36.5 | 1.25 | 46.5 | 18.0 | 300 | 74 |
| 7 | 1.40 | 35.0 | 36.5 | 1.50 | 44.3 | 18.0 | 350 | 48 |
| 8[b] | 1.40 | 35.0 | 36.5 | 2.35 | 44.3 | 18.0 | 350 | 30 |
| 9[b,c] | 1.68 | 35.0 | 40.0 | 4.00 | 43.5 | 18.0 | 400 | 32 |
| 10[b,c] | 1.68 | 35.0 | 40.0 | 1.95 | 43.5 | 18.0 | 400 | 22 |
| 11[b,c] | 1.68 | 35.0 | 40.0 | 3.00 | 43.5 | 18.0 | 450 | 18 |
| 12[b,c] | 1.68 | 35.0 | — | 4.00 | 43.5 | 16.3 | 500 | 126 |

[a]Copolymer in its ammonium salt, 65% AMPS, 15% methylvinylacylamide, 20% acrylamide.
[b]Fluid loss sample was conditioned in pressurized consistometer.
[c]Contains 0.5% dispersant.
[d]All percentages are by weight of cement (BWOC).

EXAMPLE II

The procedure of Example I was used to test the utility of the present invention as a high temperature fluid loss additive in cement compositions containing significant salt concentrations.

Cement compositions were prepared using Class H LeHavre Cement, mixing salt water and high temperature fluid loss additive as set forth in Table II. The tests were conducted using the same experimental methods of Example I. Cement compositions using Ideal Basic Class G in seawater and high temperature fluid loss additive as set forth in Table III. The tests were conducted using the same experimental methods of Example I.

TABLE II[c]

Cement: LeHavre H

| System # | % Fluid Loss[a] Additive | % Silica Sand or Flour | % Weighting Agent | % Total Retarder, Including Retarder Aid, if Any | % Sea Water | Density in Pounds Per Gallon | BHCT °F. | API Fluid Loss[b] (ml/30 min) |
|---|---|---|---|---|---|---|---|---|
| 13 | 0.65 | 35.0 | 10.0 | 0.10 | 49.0 | 16.5 | 200 | 46 |
| 14 | 1.309 | 35.0 | 20.0 | 0.40 | 48.4 | 17.0 | 250 | 32 |
| 15 | 1.309 | 35.0 | 36.5 | 1.50 | 46.0 | 18.0 | 300 | 40 |
| 16 | 1.50 | 35.0 | 36.5 | 2.35 | 43.0 | 18.0 | 350 | 32 |

[a]Copolymer in its ammonium salt 65% AMPS, 15% methylvinylacylamide, 20% acrylamide
[b]All fluid loss samples were conditioned in a pressurized consistometer
[c]All percentages are by weight of cement (BWOC)

TABLE III[c]

Cement: Ideal Basic G

| System # | % Fluid Loss[a] Additive | % Silica Sand or Flour | % Weighting Agent | % Dispersant | % Total Retarder Including Retarder Aid, if Any | % Sea Water | Density in Pounds Per Gallon | BHCT °F. | API Fluid Loss[b] (ml/30 min) |
|---|---|---|---|---|---|---|---|---|---|
| 1 | 0.75 | — | — | 0.4 | — | 43.0 | 15.6 | 100 | 78 |
| 2 | 0.75 | 35.0 | — | 0.4 | 0.50 | 52.0 | 15.8 | 150 | 48 |
| 3 | 0.75 | 35.0 | — | 0.4 | 0.25 | 52.0 | 15.8 | 150 | 52 |
| 4 | 0.84 | 35.0 | 10.0 | — | 0.50 | 49.1 | 16.5 | 200 | 86 |
| 5 | 0.84 | 35.0 | 10.0 | — | 0.25 | 49.1 | 16.5 | 200 | 118 |
| 6 | 1.12 | 35.0 | 20.0 | — | 0.75 | 47.7 | 17.4 | 250 | 58 |
| 7 | 1.40 | 35.0 | 40.0 | 0.50 | 1.50 | 45.7 | 18.0 | 308 | 36 |
| 8 | 1.50 | 35.0 | 40.0 | 0.70 | 2.20 | 45.7 | 18.0 | 350 | 32 |
| 9[d] | 1.50 | 35.0 | 40.0 | 0.70 | 2.20 | 45.7 | 18.0 | 350 | 30 |
| 10 | 1.31 | 35.0 | 60.0 | 0.75 | 2.60 | 55.9 | 18.0 | 400 | 60 |

[a]Copolymer in its ammonium salt 65% AMPS, 15% methylvinylacylamide, 20% acrylamide
[b]All fluid loss samples were conditioned in a pressurized consistometer
[c]All percentages are by weight of cement (BWOC)
[d]South Dakota G cement The principle of this invention and the best mode for contemplated for applying that principle have been disclosed. It is understood that the foregoing is for illustrative purposes and that other means and techniques may be used without departing from the true scope of this inventive concept.

I claim:

1. A cementing composition useful in cementing a casing in a high temperature well wherein the temperature ranges from about 200° F. to about 500° F. comprising:
   (a) aqueous fluid;
   (b) hydraulic cement; and
   (c) a fluid loss additive comprised of a copolymer of (1) in the range of about 5 to about 95 weight percent of 2-acrylamido-2-methylpropane-3-sulphonic acid; (2) in the range of about 5 to about 95 weight percent of a vinylacylamide; and (3) in the range of about 0 to about 80 weight percent of acrylamide.

2. The composition of claim 1 wherein said copolymer fluid loss additive is present in an amount in the range of from 0.65 percent to about 1.7 percent by weight of cement.

3. The composition of claim 2 wherein said aqueous fluid contains up to about 38 percent dissolved salt by weight of said aqueous fluid.

4. The cementing composition of claim 1 useful in cementing a casing in a high temperature well comprising:
   (a) aqueous fluid;
   (b) hydraulic cement; and
   (c) a fluid loss additive comprised of a copolymer of (1) in the range of about 10 to 90 weight percent of 2-acrylamido-2-methylpropane-3-sulphonic acid; (2) in the range of about 5 to about 95 weight percent of a vinylacylamide; and (3) in the range of about 0 to about 80 weight percent of acrylamide.

5. The composition of claim 1 wherein said copolymer fluid loss additive is present in an amount in the range of from 1.0 percent to about 1.5 percent by weight of cement.

6. The cementing composition of claim 1 useful in cementing a casing in a high temperature well comprising:
   (a) aqueous fluid;
   (b) hydraulic cement; and
   (c) a fluid loss additive comprised of a copolymer of (1) in the range of about 60 to 70 weight percent of 2-acrylamido-2-methylpropane-3-sulphonic acid; (2) in the range of about 10 to about 30 weight percent of a vinylacylamide; and (3) in the range of about 10 to about 30 weight percent of acrylamide.

7. The cementing composition of claim 1 useful in cementing a casing in a high temperature well comprising:
   (a) aqueous fluid;
   (b) hydraulic cement; and
   (c) a fluid loss additive comprised of a copolymer of (1) in the range of about 10 to 90 weight percent of 2-acrylamido-2-methylpropane-3-sulphonic acid; (2) in the range of about 7 to about 80 weight percent of a vinylacylamide; and (3) in the range of about 5 to about 60 weight percent of acrylamide.

8. The composition of claim 7 wherein said copolymer fluid loss additive is present in an amount in the range of from 1.3 percent to about 1.4 percent by weight of cement.

9. The composition of claim 8 wherein said aqueous fluid contains up to about 38 percent dissolved salt by weight of said aqueous fluid.

10. The composition of claim 9 useful in cementing a casing in a high temperature well comprising:
   (a) aqueous fluid containing up to about 4 percent dissolved salt by weight of said aqueous fluid;
   (b) hydraulic cement; and
   (c) a fluid loss additive comprised of a copolymer of
      (1) in the range of about 5 to 95 weight percent of 2-acrylamido-2-methylpropane-3-sulphonic acid;
      (2) in the range of about 5 to about 95 weight percent of a vinylacylamide; and (3) in the range of about 0 to about 80 weight percent of acrylamide.

11. The composition of claim 10 useful in cementing a casing in a high temperature well comprising:
   (a) aqueous fluid containing up to about 4 percent dissolved salt by weight of said aqueous fluid;
   (b) hydraulic cement; and
   (c) a fluid loss additive comprised of a copolymer of
      (1) in the range of about 60 to 70 weight percent of 2-acrylamido-2-methylpropane-3-sulphonic acid;
      (2) in the range of about 10 to about 30 weight percent of a vinylacylamide; and (3) in the range of about 10 to about 30 weight percent of acrylamide.

12. A method of cementing a casing in a borehole penetrating a high temperature subterranean formation wherein the temperature ranges from about 200° F. to about 500° F. comprising:
   introducing a cementing composition into the annulus between said conduit and said formation, said cementing composition containing a fluid loss additive comprised of a copolymer of (1) 5 to 95 weight percent of 2-acrylamido-2-methylpropane-3-sulphonic acid; (2) 5 to 95 weight percent of a vinylacylamide; and (3) 0 to 80 weight percent of acrylamide; and
   allowing said cementing composition to set within said space.

13. The method of claim 12 wherein said copolymer fluid loss additive is present in an amount in the range of from 0.65 percent to about 1.7 percent by weight of cement.

14. The method of claim 13 wherein said aqueous fluid contains up to about 38 percent dissolved salt by weight of said aqueous fluid.

15. The method of claim 14 useful in cementing a casing in a high temperature well comprising:
   (a) aqueous fluid;
   (b) hydraulic cement; and
   (c) a fluid loss additive comprised of a copolymer of
      (1) in the range of about 10 to 90 weight percent of 2-acrylamido-2-methylpropane-3-sulphonic acid;
      (2) in the range of about 5 to about 95 weight percent of a vinylacylamide; and (3) in the range of about 0 to about 80 weight percent of acrylamide.

16. The method of claim 12 wherein said copolymer fluid loss additive is present in an amount in the range of from 1.0 percent to about 1.5 percent by weight of cement.

17. The method of claim 12 useful in cementing a casing in a high temperature well comprising:
   (a) aqueous fluid;
   (b) hydraulic cement; and
   (c) a fluid loss additive comprised of a copolymer of
      (1) in the range of about 60 to 70 weight percent of 2-acrylamido-2-methylpropane-3-sulphonic acid;
      (2) in the range of about 10 to about 30 weight percent of a vinylacylamide; and (3) in the range of about 10 to about 30 weight percent of acrylamide.

18. The method of claim 17 useful in cementing a casing in a high temperature well comprising:
   (a) aqueous fluid;
   (b) hydraulic cement; and
   (c) a fluid loss additive comprised of a copolymer of
      (1) in the range of about 10 to 90 weight percent of 2-acrylamido-2-methylpropane-3-sulphonic acid;
      (2) in the range of about 7 to about 80 weight percent of a vinylacylamide; and (3) in the range of about 5 to about 60 weight percent of acrylamide.

19. The method of claim 17 wherein said copolymer fluid loss additive is present in an amount in the range of from 1.3 percent to about 1.4 percent by weight of cement.

20. The method of claim 17 wherein said aqueous fluid contains up to about 38 percent dissolved salt by weight of said aqueous fluid.

21. The method of claim 12 useful in cementing a casing in a high temperature well comprising:
   (a) aqueous fluid containing up to about 4 percent dissolved salt by weight of said aqueous fluid;
   (b) hydraulic cement; and
   (c) a fluid loss additive comprised of a copolymer of
      (1) in the range of about 5 to 95 weight percent of 2-acrylamido-2-methylpropane-3-sulphonic acid;
      (2) in the range of about 5 to about 95 weight percent of a vinylacylamide; and (3) in the range of about 0 to about 80 weight percent of acrylamide.

22. The method of claim 21 useful in cementing a casing in a high temperature well comprising:
   (a) aqueous fluid containing up to about 4 percent dissolved salt by weight of said aqueous fluid;
   (b) hydraulic cement; and
   (c) a fluid loss additive comprised of a copolymer of
      (1) in the range of about 60 to 70 weight percent of 2-acrylamido-2-methylpropane-3-sulphonic acid;
      (2) in the range of about 10 to about 30 weight percent of a vinylacylamide; and (3) in the range of about 10 to about 30 weight percent of acrylamide.

23. A method of cementing a conduit in a borehole penetrating a high temperature subterranean formation wherein the temperature ranges from about 200° F. to about 500° F. by introducing a cementing composition into the annulus between said conduit and said formation, said cementing composition comprising:
   cement;
   an aqueous fluid containing dissolved salt; and
   a fluid loss additive comprised of a copolymer of (1) 5 to 95 weight percent of 2-acrylamido-2-methylpropane-3-sulphonic acid; (2) 5 to 95 weight percent of a vinylacylamide; and (3) 0 to 80 weight percent of acrylamide.

24. The method of claim 23 wherein said copolymer fluid loss additive is present in an amount in the range of from 0.65 percent to about 1.7 percent by weight of cement.

25. The method of claim 23 wherein said aqueous fluid contains up to about 38 percent dissolved salt by weight of said aqueous fluid.

26. The method of claim 23 useful in cementing a casing in a high temperature well comprising:
   (a) aqueous fluid;

(b) hydraulic cement; and
(c) a fluid loss additive comprised of a copolymer of (1) in the range of about 10 to 90 weight percent of 2-acrylamido-2-methylpropane-3-sulphonic acid; (2) in the range of about 5 to about 95 weight percent of a vinylacylamide; and (3) in the range of about 0 to about 80 weight percent of acrylamide.

27. The method of claim 23 wherein said copolymer fluid loss additive is present in an amount in the range of from 1.0 percent to about 1.5 percent by weight of cement.

28. The method of claim 23 useful in cementing a casing in a high temperature well comprising:
(a) aqueous fluid;
(b) hydraulic cement; and
(c) a fluid loss additive comprised of a copolymer of (1) in the range of about 60 to 70 weight percent of 2-acrylamido-2-methylpropane-3-sulphonic acid; (2) in the range of about 10 to about 30 weight percent of a vinylacylamide; and (3) in the range of about 10 to about 30 weight percent of acrylamide.

29. The method of claim 23 useful in cementing a casing in a high temperature well comprising:
(a) aqueous fluid;
(b) hydraulic cement; and
(c) a fluid loss additive comprised of a copolymer of (1) in the range of about 10 to about 90 weight percent of 2-acrylamido-2-methylpropane-3-sulphonic acid; (2) in the range of about 7 to about 80 weight percent of a vinylacylamide; and (3) in the range of about 5 to about 60 weight percent of acrylamide.

30. The method of claim 29 wherein said copolymer fluid loss additive is present in an amount in the range of from 1.3 percent to about 1.4 percent by weight of cement.

31. The method of claim 30 wherein said aqueous fluid contains up to about 38 percent dissolved salt by weight of said aqueous fluid.

32. The method of claim 31 useful in cementing a casing in a high temperature well comprising:
(a) aqueous fluid containing up to about 4 percent dissolved salt by weight of said aqueous fluid;
(b) hydraulic cement; and
(c) a fluid loss additive comprised of a copolymer of (1) in the range of about 5 to 95 weight percent of 2-acrylamido-2-methylpropane-3-sulphonic acid; (2) in the range of about 5 to about 95 weight percent of a vinylacylamide; and (3) in the range of about 0 to about 80 weight percent of acrylamide.

33. The method of claim 32 useful in cementing a casing in a high temperature well comprising:
(a) aqueous fluid containing up to about 4 percent dissolved salt by weight of said aqueous fluid;
(b) hydraulic cement; and
(c) a fluid loss additive comprised of a copolymer of (1) in the range of about 60 to 70 weight percent of 2-acrylamido-2-methylpropane-3-sulphonic acid; (2) in the range of about 10 to about 30 weight percent of a vinylacylamide; and (3) in the range of about 10 to about 30 weight percent of acrylamide.

* * * * *